United States Patent [19]

Matthews et al.

[11] 3,846,823

[45] Nov. 5, 1974

[54] SEMICONDUCTOR ASSEMBLY

[75] Inventors: Benjamin H. Matthews, Peninsula; Jules W. Rhine, Bedford, both of Ohio

[73] Assignee: Lucerne Products, Inc., Northfield, Ohio

[22] Filed: June 1, 1973

[21] Appl. No.: 366,051

Related U.S. Application Data

[63] Continuation of Ser. No. 169,255, Aug. 5, 1971, abandoned.

[52] U.S. Cl. ........................ 357/74, 357/75, 357/76, 357/79, 357/81, 174/52 S, 29/589

[51] Int. Cl. ............................ H01l 3/00, H01l 5/00

[58] Field of Search ................ 317/234, 1, 2, 3, 3.1, 317/4, 4.1, 11; 174/52 S; 29/588, 589

[56] References Cited

UNITED STATES PATENTS

| | | | |
|---|---|---|---|
| 2,609,429 | 9/1952 | Law | 317/234 |
| 3,183,407 | 5/1965 | Yasuda et al. | 317/234 W |
| 3,374,405 | 3/1968 | Davis et al. | 317/234 |
| 3,391,310 | 7/1968 | Gentry | 317/235 AB |
| 3,417,300 | 12/1968 | Kauffman | 317/234 G |
| 3,428,871 | 2/1969 | Scott et al. | 317/234 E |
| 3,475,663 | 10/1969 | Boyer | 317/234 F |
| 3,497,947 | 3/1970 | Ardezzone | 317/234 F |

FOREIGN PATENTS OR APPLICATIONS

| | | | |
|---|---|---|---|
| 1,181,297 | 2/1970 | Great Britain | 317/234 P |

*Primary Examiner*—Andrew J. James
*Attorney, Agent, or Firm*—Baldwin, Egan, Walling & Fetzer

[57] ABSTRACT

A semiconductor assembly including a ceramic body formed to receive a semiconductor and its leads such that the body functions as an assembly fixture. The body, with the semiconductor and leads inserted therein, is positioned in a metallic cap with such assembly being retained in the cap by an encapsulating compound, or by a non-metallic cap. In another form of the invention, the assembly includes two coacting ceramic bodies secured together with a semiconductor therein. The leads may be straight, pin-shaped, L-shaped, etc.

14 Claims, 27 Drawing Figures

SEMICONDUCTOR ASSEMBLY

This is a continuation of application Ser. No. 169,255 filed Aug. 5, 1971, now abandoned.

This invention relates to semiconductors and more particularly to unique semiconductor structures and methods of assembling the same.

Because of their small size, semiconductor devices are very difficult to assembly under high speed production line conditions.

Therefore, it is an object of the invention to provide semiconductor structures that are very easy to fabricate, particularly under high speed assembly line conditions.

A further object of the invention is to provide a semiconductor assembly wherein at least one of its parts functions as an assembly fixture to facilitate fabrication.

A further object of the invention is to provide a method of assembly of a semiconductor device of the above type.

A further object of the invention is to provide a semiconductor assembly that is simple in construction, easy to fabricate, and highly effective in operation.

Briefly, the foregoing objects are accomplished by the provision of a semiconductor assembly including a semiconductor device having a cathode electrode and a gate electrode on one side and having an anode electrode on the other side thereof. A non-conducting ceramic body having a cavity configured to receive the semiconductor device therein is provided. The semiconductor device is disposed in the cavity, with the one side of the device disposed inwardly of the body cavity. A pair of leads in the form of a first electrical cathode lead and a second electrical gate lead extends through the body and electrically contacts the cathode electrode and the gate electrode, respectively. A cap formed of electrical conducting metal material and having an open-ended cavity for receiving the body with leads and semiconductor device assembled thereto is provided whereby the anode electrode is disposed inwardly of the open-ended cap cavity and is in electrical contact with the cap. An encapsulating compound is secured to the open end of the cap cavity to retain the assembled body, leads and semiconductor device in the cap. A non-metallic cap may be used instead of such compound. The body is formed with a pair of spaced, parallel apertures, with one of the apertures leading to the gate electrode. The leads are headed pins that are disposed in the apertures, whereby the body functions as a fixture for receiving the pins and semiconductor device with the heads on the pins being disposed between the body and the semiconductor device in electrical contact with the respective adjacent electrodes. The cathode pin may be of larger cross-sectional diameter than the gate pin to provide greater current carrying capacity. A diode or trigger chip or other semiconductor chip may be included in the semiconductor assembly with such chip being disposed either between the electrode and its lead or between the metal cap and a lead.

In another form of the invention the cap may contain just a simple trigger chip and its lead, and a modification thereof may have either a resistor, capacitor or other electrical component disposed between the cap and the chip.

In still another form of the invention, the assembly may be formed of a pair of matching, non-conducting ceramic bodies, each having a cavity coacting with the cavity in the opposite body to form a space to receive the semiconductor device therein.

In all forms of the invention the leads may be of any suitable configuration such as headed or headless pins, O-shaped, L-shaped, etc.

Thus, by using the body as a fixture, the invention provides a semiconductor assembly that can be very easily and quickly fabricated under high speed production line conditions.

Other objects and advantages of the invention will be apparent from the following description taken in conjunction with the drawings wherein.

Figure 1:
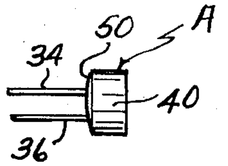
FIG. 1 is a side elevational view of a semiconductor device assembly constructed in accordance with the invention.
Figure 2:
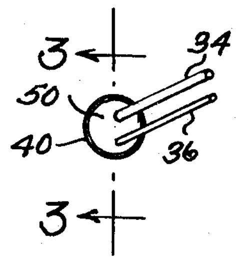
FIG. 2 is a left end perspective view of the assembly shown in FIG. 1.

Although the invention is shown and described herein with reference to a semiconductor device, it will be understood that it may be applied to any like type of electronic device or assembly.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

In the drawings, like numerals are used to illustrate like and similar parts throughout the several views.

Referring to FIGS. 1–6, there is shown a semiconductor assembly of the invention and generally designated as A, including a semiconductor device 10 having a cathode electrode 12 and a gate electrode 14 on one side 16 and having an anode electrode 18 on the other side 20 thereof. Although the device 10 is shown in the configuration of an equilateral triangle, it will be understood that it may have any suitable shape. A non-conducting ceramic body 22 having a triangular cavity 24 configured to snugly receive the semiconductor device 10 therein is provided. The semiconductor device 10 is disposed or assembled in the body cavity 24, with the one side 16 of the device 10 disposed inwardly of the body cavity 24. The body is formed with a pair of spaced parallel apertures 30, 32 with the aperture 30 leading to the cathode electrode and the aperture 32 leading to the gate electrode. A pair of leads in the form of a first electrical cathode lead 34 and a second electrical gate lead 36 extend through the body apertures 30, 32, respectively, and electrically contact the cathode electrode 12 and the gate electrode 14, respectively.

The non-conducting body 22 may be formed of any suitable non-conducting material such as ceramic, glass, plastic, various resins and binders, etc.

A cap 40 formed of electrical conducting metal material and having an open-ended cavity 42 for receiving the body 22 with leads 34, 35 and semiconductor device 10 assembled thereto is provided whereby the anode electrode 18 is disposed inwardly of the open-ended cap cavity 42 and thus is in electrical contact with the cap 40. An encapsulating compound 50 is secured to the open end of the cap cavity 42 to retain the assembled body 22, leads 34, 36, and semiconductor device 10 in the cap 40. The leads 34, 36 are in the form of pins having heads 38, 39 respectively.

Thus, the body 22 functions as a fixture for receiving the pins 34, 36 and semiconductor device 10, with the heads 38, 39 on the pins being disposed between the body 22 and the semiconductor device 10 in electrical contact with the respective adjacent electrodes 12 and 14. The cathode pin or lead 34 is of larger cross-sectional diameter than the gate pin or lead 36 to provide larger current carrying capacity.

Thus, by using the body 22 as a fixture, the invention provides a semiconductor assembly A that can be very easily and quickly fabricated under high speed production line conditions.

Figure 6:
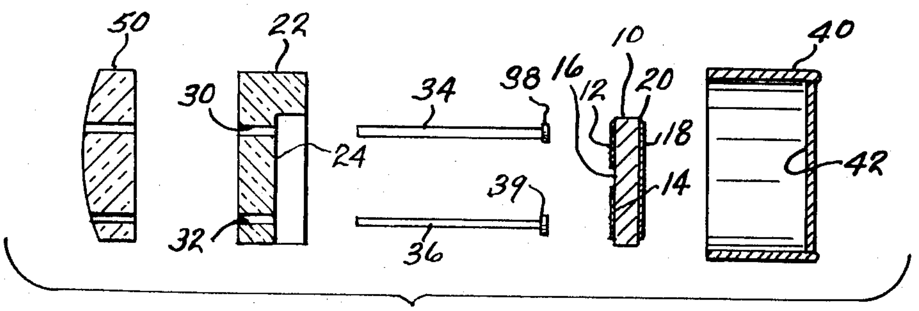
FIG. 6 is an exploded view of the assembly shown in FIG. 1 and showing the relative position of the parts prior to assembly.

FIG. 6 shows the position of the parts prior to assembly. First the pins 34, 36 are inserted in the body apertures 30, 32, respectively. Then, the semiconductor device 10 is inserted in the body cavity 24. This assembly is then inserted in the cap cavity 42, whereby the anode electrode 18 electrically contacts the cap 40. Finally, an encapsulating compound 50 is applied over the open end of the cavity 42 to retain and seal the assembly within the cap.

Accordingly, the invention contemplates a method of fabricating a semiconductor assembly including inserting an electrical lead (34 for example) in a non-electrical conducting body 22 having a cavity 24, whereby one end of the lead is in communication with the cavity 24; positioning a semiconductor device 10, having electrodes 12, 18 on both sides thereof, in the cavity 24 whereby the lead 34 electrically contacts the adjacent semiconductor electrode 12; and inserting the assembled body 22, lead 34, and device 10 in the cavity 42 of an electrical conducting cap 40 whereby the other semiconductor electrode 18 electrically contacts the cap 40.

In further detail, the method includes the steps of: providing a non-electrical conducting body 22 having a semiconductor receiving cavity 24 therein; inserting an electrical lead 34 through the body 22 in communication with the cavity 24; inserting a semiconductor device 10, having at least one electrode (12, 18) on each side thereof, in the body cavity 24, whereby the lead 34 is in electrical contact with the adjacent semiconductor electrode 12; providing an electrical conducting cap 40 having a cavity 42; inserting the assembled body 22, lead 34, and semiconductor 10 into the cap cavity 42 whereby the other electrode 18 is in electrical contact with the cap 40; and applying an encapsulating compound 50 over the open end of the cap cavity 42 to seal and retain the body 22, lead 34, and device 10 in the cap 40.

The method of the invention may also include fusing the lead 34 to the adjacent electrode 12 and fusing the cap 40 to the other electrode 18 to provide a firm electrical connection. The fusing may be effected by any suitable bonding such as, for example, soldering, or by heating the completed assembly in a furnace. If the fusing is to be effected by furnace heating, solder and a fluxing agent, (or equivalent) must be present.

Figure 7:
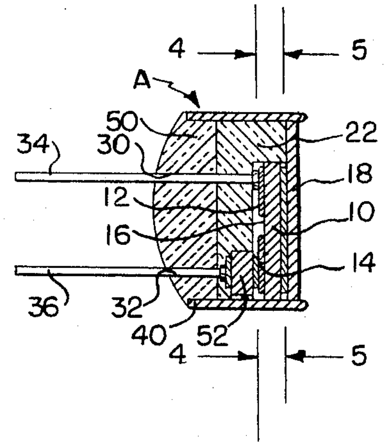
FIG. 7 illustrates a modification of the device shown in FIG. 3.
Figure 8:
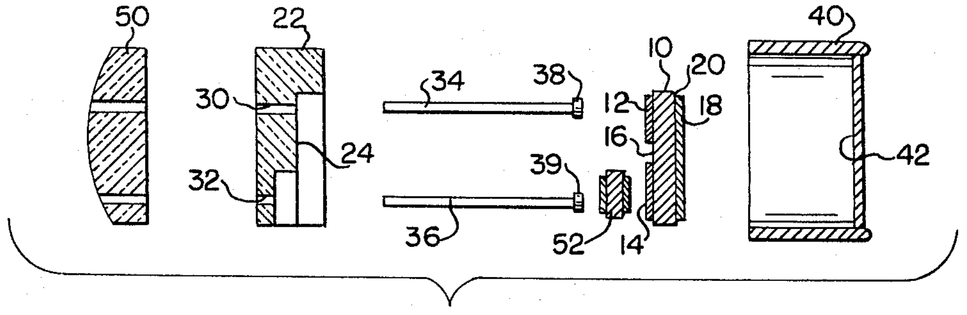
FIG. 8 is an exploded view of the assembly shown in FIG. 7 and showing the relative position of the parts prior to assembly.
Figure 9:
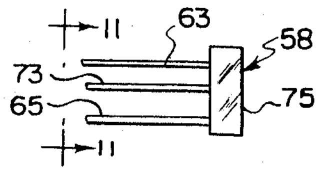
FIG. 9 illustrates a further modification of the device shown in FIG. 1.
Figure 10:
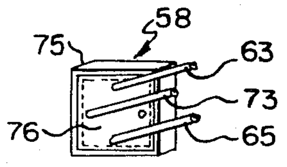
FIG. 10 is a left end perspective view of the device shown in FIG. 9.
Figure 11:
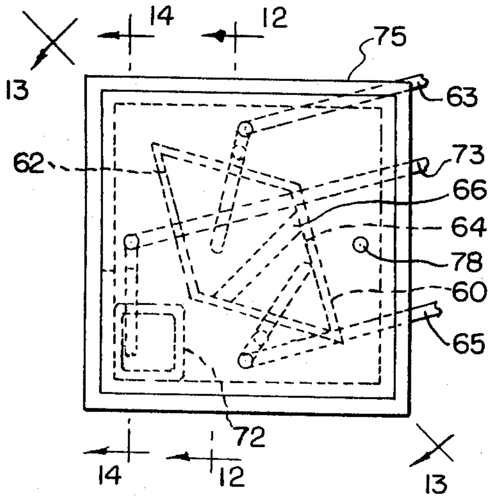
FIG. 11 is an enlarged view taken along the line 11—11 of FIG. 9.
Figure 12:
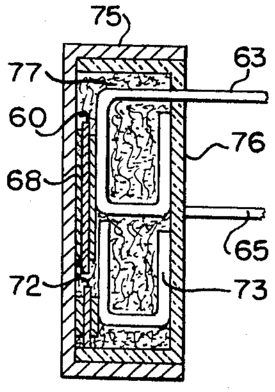
FIG. 12 is a view taken along the line 12—12 of FIG. 11.
Figure 13:
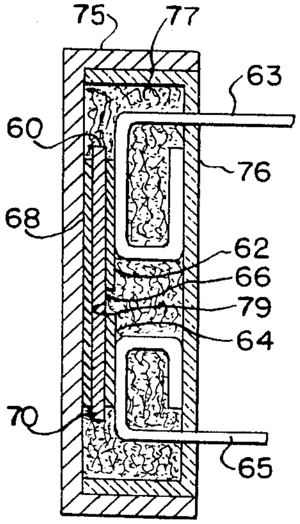
FIG. 13 is a view taken along the line 13—13 of FIG. 11.
Figure 14:
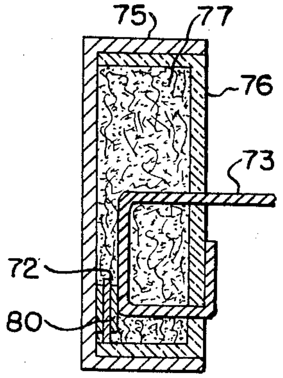
FIG. 14 is a view taken along the line 14—14 of FIG. 11.

The semiconductor assembly of FIGS. 7 and 8 is similar to that of FIGS. 1 through 6 except that a diode or trigger chip 52 has been interposed between the gate electrode 14 and its lead 36. If a non-passivated chip is used, a junction sealing compound may be used.

Referring to FIGS. 9 through 14, there is shown a modified semiconductor device or assembly 58 including a quadrangular shaped silicon semiconductor 60 having a cathode electrode 62 and its lead 63, and a gate electrode 64 and its lead 65 on one side 66 and having an anode electrode 68 on the other side 70 thereof. Also included in the assembly is a semiconductor chip 72 (such as, for example, a rectifier chip) and its lead 73. The device 60 and the chip 72 and their respective leads are retained in a metal cap 75 by a non-conducting cap 76 which is telescoped into the cap 75. The body 77 is formed by inserting a solidifiable compound through the aperture 78 in the cap 76 after such cap is positioned in the cap 75.

Thus, the assembly 58 includes a body 77 having cavities 79, 80, containing one or more semiconductor devices 60, 72 and their respective leads 63, 65, 73, all being contained within in a pair of coacting telescoping caps 75, 76 with the non-conducting cap 76 functioning as a means for retaining the assembly within the metal cap 75. In FIGS. 9 through 13, the chips 60, 72 are shown in position to best illustrate the invention, although it will be understood that other positions of such chips within the assembly may be used in accordance with the needs of particular applications.

In the structure of assembly 58 it is preferred that each lead 63, 65, 73 has its end that is disposed within the device bent back upon itself in substantially a circle to effect an O-shaped configuration, with such O-shaped portion being disposed between an electrode and the non-metallic or non-conducting cap 76.

Figure 15:
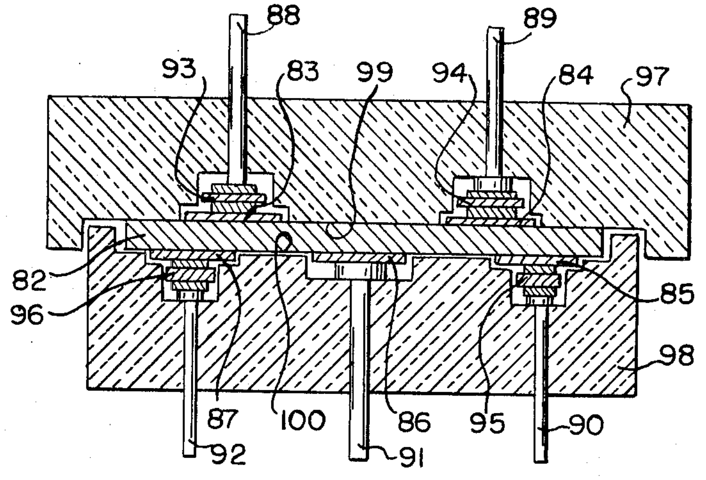
FIG. 15 is an enlarged vertical sectional view of a further modification of the device shown in FIG. 3.

Referring to FIG. 15, there is shown a semiconductor assembly including a semiconductor device 82 having a plurality of electrodes 83, 84, 85, 86, 87 and their respective leads 88, 89, 90, 91, 92. The assembly also includes auxiliary chips 93, 94, 95 96 disposed between the respective electrodes, as shown, and their leads. All these parts are retained between a pair of matching, coacting, non-conducting bodies 97, 98 each having a (respective) cavity 99, 100, opposite the cavity on the other body to form an enclosed space configured to snugly receive the device 82 and its triggers and leads when the bodies are placed together in coacting relation. The bodies may be retained together by any suitable sealing compound such as varnish placed between the peripheral joints. Also, the binding of the devices to the leads may be effected by any suitable means.

Figure 16:
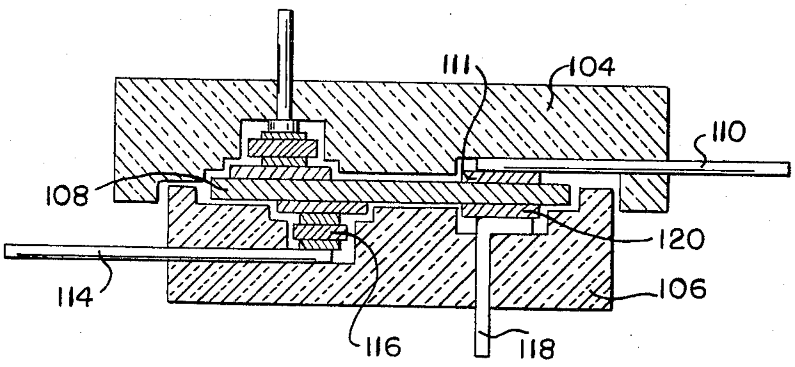
FIG. 16 is a vertical sectional view of a modification of the device shown in FIG. 15.
Figure 17:
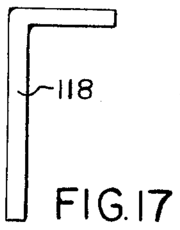
FIG. 17 is an enlarged view of the lower right lead shown in FIG. 16.

In FIG. 16, the assembly is similar to that of FIG. 15 and includes matching ceramic bodies 104, 106 containing a semiconductor 108. The lead 110 may be a straight wire-type lead and its inner end is disposed between the body 104 and the electrode 111. Likewise, the lead 114 may be straight and its inner end is disposed between the body 106 and the trigger 116. The lead 118 (FIGS. 16 and 17) is L-shaped with the foot of the L being disposed between the electrode 120 and the body 106. Also, the lead may be the headless straight pin type as shown by the pin 88 in FIG. 15.

Figure 3:
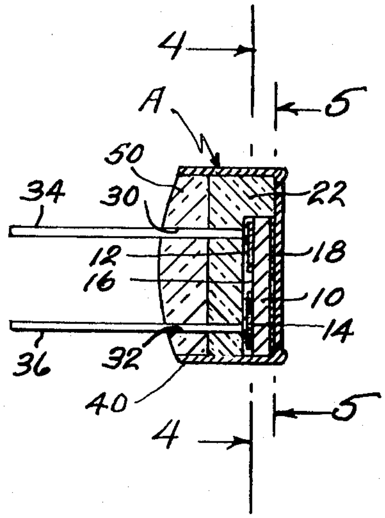
FIG. 3 is an enlarged view taken along the line 3—3 of FIG. 2.
Figure 4:
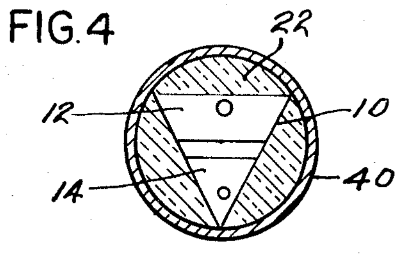
FIG. 4 is an enlarged view taken along the line 4—4 of FIG. 3.
Figure 5:
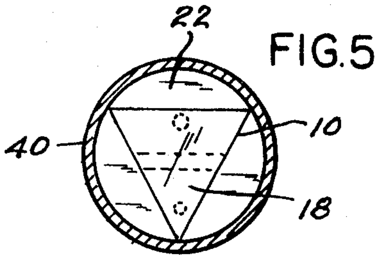
FIG. 5 is an enlarged view taken along the line 5—5 of FIG. 3.
Figure 18:
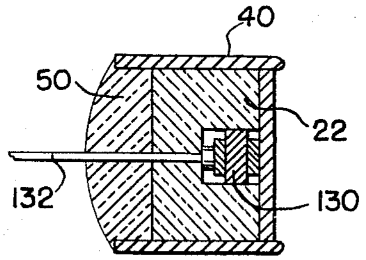
FIG. 18 is a sectional view of a modification of the device shown in FIG. 3.
Figure 19:
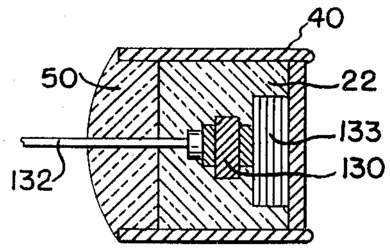
FIG. 19 illustrates a modification of the device shown in FIG. 18.
Figure 20:
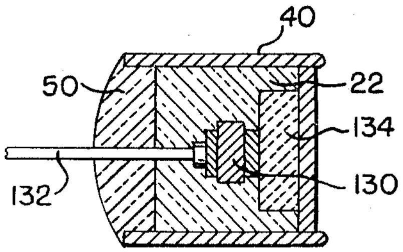
FIG. 20 illustrates a further modification of the device shown in FIG. 18.
Figure 21:
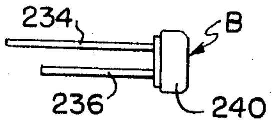
FIG. 21 is a side elevational view of a modification of the semiconductor device assembly shown in FIG. 1.
Figure 22:
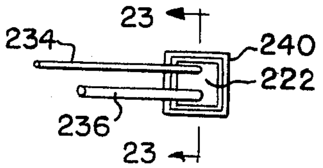
FIG. 22 is a left end perspective view of the assembly shown in FIG. 21.
Figure 23:
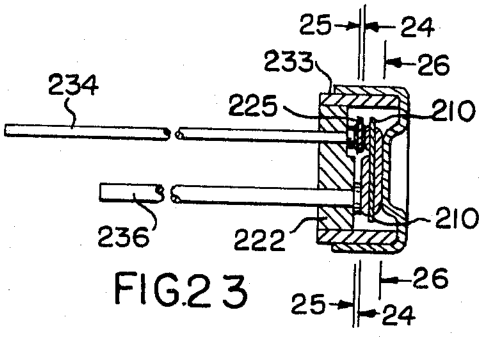
FIG. 23 is an enlarged view taken along the line 23—23 of FIG. 22.
Figure 24:
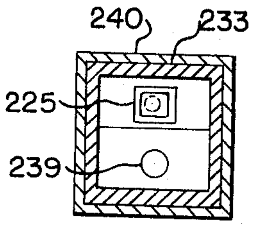
FIG. 24 is an enlarged view taken along the line 24—24 of FIG. 23.
Figure 25:
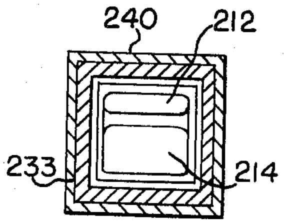
FIG. 25 is an enlarged view taken along the line 25—25 of FIG. 23.
Figure 26:
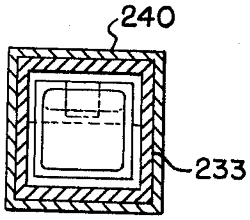
FIG. 26 is an enlarged view taken along the line 26—26 of FIG. 23.

The assemblies of FIGS. 18, 19 and 20 are similar to the structure of FIG. 3 and contain the usual metal cap 40, body 22 and encapsulating compound 50. FIG. 18 illustrates a semiconductor assembly having only a semiconductor chip 130 and its lead 132. In FIG. 19, a capacitor 113 is disposed between the cap 40 and the chip 130. In FIG. 20 a resistor 134 is disposed between the cap 40 and the chip 130. It will be understood that any suitable electrical component may be used instead of the capacitor 133 or the resistor 134.

FIGS. 21 through 27 illustrate a modification of the assembly shown in FIGS. 1 through 6. More specifically, in FIGS. 21 through 27 there is shown a further semiconductor assembly of the invention generally designated as B and including a semiconductor device 210 having (for example) a cathode electrode 212 and a gate electrode 214 on one side 216 and having an anode electrode 218 on the other side 220 thereof. Although the device 210 and the assembly B are shown in the configuration of a square, it will be understood that they may have any suitable shape, such as round, oval, hexagonal, diamond-shaped, rectangular, etc. A non-conducting ceramic body 222 having a cavity 224 configured to receive the semiconductor chip 225 therein is provided. The body 222 is formed with a pair of spaced parallel apertures 230, 232. A pair of leads in the form of a first electrical lead 234 and a second electrical lead 236 extend through the body apertures 230, 232, respectively.

The non-conducting body 222 may be formed of any suitable non-conducting material such as ceramic, glass, plastic, various resins and binders, etc.

The assembly thus far described is encased in a peripheral shell 233 of non-conducting material and such shell, in turn is disposed in the cap 240 now to be described.

A cap 240 formed of electrical conducting metal material and having an open-ended cavity 242 for receiving the shell 233 with the body 222, leads 234, 236, the chip 225, and semiconductor device 210 assembled therein is provided whereby the electrode 18 is disposed inwardly of the open-ended cap cavity 242 and thus is in electrical contact with the cap indent 241. Varnish may be used in the bottom and/or sides of the cap 240 to retain the parts therein, such varnish usually being added after the parts are soldered by furnace heating. The leads 234, 236 may be in the form of pins having heads 238, 239, respectively.

Thus, the body 222 and the shell 233 function as fixtures for receiving the pins 234, 236, the chip 225 and the semiconductor device 210, with the heads 238, 239 on the pins being disposed between the body 222 and the chip 225 and the semiconductor device 210 respectively in electrical contact with the respective adjacent electrodes.

Thus, by using the body 222 and the shell 233 as fixtures, the invention provides a semiconductor assembly B that can be very easily and quickly fabricated under high speed production line conditions.

Figure 27:
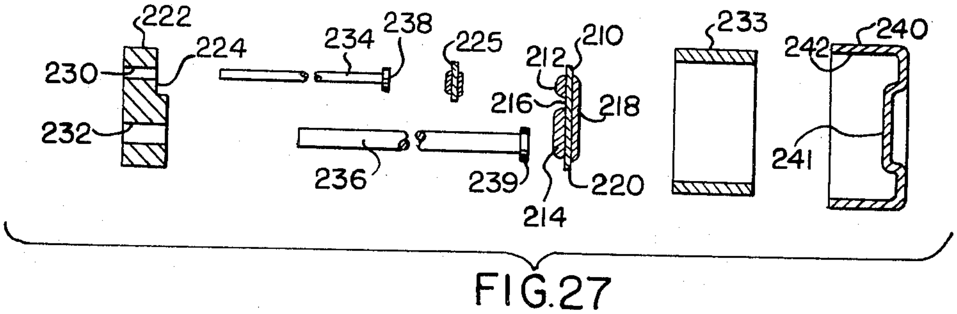
FIG. 27 is an exploded view of the assembly shown in FIG. 21 and showing the relative position of the parts prior to assembly.

FIG. 27 shows the position of the parts prior to assembly. Before the assembly is put in the cap 240, it may first be soldered, tested, and then inserted into the cap without the use of additional fixturing.

What is claimed is:

1. A semiconductor assembly comprising a semiconductor device having a predetermined peripheral shape, a non-conducting ceramic body defining a fixture for said assembly and having opposite faces, a shaped recess in one face thereof configured to closely conform to the peripheral shape of said semiconductor device, a cathode electrode and a spaced gate electrode on one side of said semiconductor device, an anode electrode on the other side of said semiconductor device, an electrical lead bonded to each of said gate and cathode electrodes, openings extending through said body from said shaped recess and through to the other face thereof, said semiconductor device being received in said recess and presenting a substantially flush surface at said one face, said electrical leads extended through said openings, a cup-shaped, one-piece metallic cap having a substantially flat end wall and an integral, upstanding side wall defining a cavity, said body and said semiconductor device fitted in said cavity in said cap with said anode electrode in engagement with said cap end wall, and an encapsulating compound secured in the cavity in the cap outwardly of the body to retain the assembled body, electrical leads, and semiconductor device in the cap, said ceramic body thus serving as a fixture for the electrical leads and semiconductor device in the cap whereby the semiconductor assembly can be easily and quickly fabricated under high speed production line conditions.

2. The structure of claim 1 wherein said electrical leads comprise pins, and said pins have heads that are disposed between the body and the semiconductor device and in electrical contact with the respective adjacent electrodes.

3. The structure of claim 2 wherein the cathode pin is of larger cross-sectional diameter than the gate pin to provide greater current carrying capacity.

4. The structure of claim 1 wherein said semiconductor is in the form of an equilateral triangle.

5. The structure of claim 1 wherein a semiconductor chip is disposed between an electrode and its lead.

6. The structure of claim 1 wherein said device is a semiconductor chip.

7. A semiconductor assembly as in claim 1 wherein said semiconductor device has the shape of an equilateral triangle, and said leads are headed pins disposed in said openings, whereby said body functions as a fixture for receiving the pins and semiconductor device; the heads on said pins being disposed between the body and the semiconductor device in electrical contact with the respective adjacent electrodes.

8. A semiconductor assembly comprising a substantially flat semiconductor device having a predetermined peripheral shape, a non-conducting body having opposite faces and having a recess in one face thereof, said semiconductor device snugly received in said recess and presenting a substantially flush surface at said one face, said recess conforming to the peripheral shape of the semiconductor device, at least one aperture through said body from said recess to the other face thereof, a first electrode bonded on one side of said semiconductor device and received in said recess behind said semiconductor device, an electrical lead extended through said aperture and into electrically conductive relationship with said first electrode, a second electrode bonded on the other side of said semiconductor device, and non-conducting means fixed to said body at said one face thereof and at least partially surrounding said body to retain said semiconductor device, said electrodes, said electrical leads, and said body in assembled relationship.

9. The structure of claim 8 wherein said lead has its end that is disposed within the body bent back upon itself in substantially a circle to effect an O-shaped configuration, with such O-shaped portion being disposed between an electrode and said non-metallic cap.

10. The structure of claim 8 wherein said lead is L-shaped in configuration with the foot of the L contacting the first electrode.

11. The structure of claim 9 wherein a trigger chip is disposed in the recess, and said O-shaped portion is disposed between the chip and the non-metallic cap.

12. The structure of claim 8 wherein said semiconductor device is a semiconductor chip, and said means is a non-metallic cap, and a resistor is disposed between the cap and the chip.

13. The structure of claim 8 wherein said semiconductor device is a semiconductor chip, and said means is a non-metallic cap, and a capacitor is disposed between the cap and the chip.

14. The structure of claim 1 wherein the assembly is square in transverse configuration.

* * * * *